(12) United States Patent
Cusimano

(10) Patent No.: US 12,044,413 B2
(45) Date of Patent: Jul. 23, 2024

(54) COOKING APPLIANCE WITH INTEGRAL DRAIN

(71) Applicant: Chad Michael Cusimano, Rochester, NY (US)

(72) Inventor: Chad Michael Cusimano, Rochester, NY (US)

( * ) Notice: Subject to any disclaimer, the term of this patent is extended or adjusted under 35 U.S.C. 154(b) by 198 days.

(21) Appl. No.: 16/766,279

(22) PCT Filed: Nov. 19, 2018

(86) PCT No.: PCT/US2018/061723
§ 371 (c)(1),
(2) Date: May 21, 2020

(87) PCT Pub. No.: WO2019/103949
PCT Pub. Date: May 31, 2019

(65) Prior Publication Data
US 2020/0370758 A1    Nov. 26, 2020

Related U.S. Application Data

(60) Provisional application No. 62/589,998, filed on Nov. 22, 2017.

(51) Int. Cl.
*F24C 15/14*    (2006.01)
*E03C 1/22*    (2006.01)
(Continued)

(52) U.S. Cl.
CPC .............. *F24C 15/14* (2013.01); *E03C 1/22* (2013.01); *F24C 3/126* (2013.01); *F24C 7/083* (2013.01); *F24C 13/00* (2013.01); *F24C 15/10* (2013.01)

(58) Field of Classification Search
None
See application file for complete search history.

(56) References Cited

U.S. PATENT DOCUMENTS 2,178,411 A * 10/1939 Tietz ...................... F24C 3/008
                                                                312/107
2,222,960 A * 11/1940 Strachan ................ A47B 77/08
                                                                219/393
(Continued)

FOREIGN PATENT DOCUMENTS

CN    203412054 U  *  1/2014
CN    204201952 U  *  3/2015
(Continued)

*Primary Examiner* — Jorge A Pereiro
(74) *Attorney, Agent, or Firm* — Patent Technologies, LLC; Robert D. Gunderman, Jr.

(57) ABSTRACT

A cooking appliance with an integral drain is disclosed that has at least one burner and an inclined surface adjacent to the burner that terminates with a strainer and drain pipe. This allows one to drain a pot of hot liquid without the dangers of transporting the pot of hot liquid from the stovetop to the sink. A novel drain pot may also be used with the cooking appliance with an integral drain. The drain pot is a cooking vessel with a drain valve. The drain valve can be opened to allow hot liquid in the vessel to drain directly into the integral drain of the cooktop without the need to move or lift the pot. The cooking appliance with an integral drain serves to drastically reduce the risk of burns from mishandled, dropped or spilled pots full of boiling hot liquids such as water.

18 Claims, 18 Drawing Sheets

(51) Int. Cl.
*F24C 3/12* (2006.01)
*F24C 7/08* (2006.01)
*F24C 13/00* (2006.01)
*F24C 15/10* (2006.01)

(56) References Cited

U.S. PATENT DOCUMENTS

| | | | | |
|---|---|---|---|---|
| 2,620,785 A * | 12/1952 | Paul | | F24C 15/00 |
| | | | | 126/214 B |
| 3,308,484 A * | 3/1967 | Povalski | | E03C 1/264 |
| | | | | 4/287 |
| 3,472,219 A * | 10/1969 | Roy | | A47B 51/00 |
| | | | | 126/37 R |
| 3,719,507 A * | 3/1973 | Bardeau | | A47J 37/0611 |
| | | | | 99/425 |
| 4,400,272 A * | 8/1983 | Logsdon | | E04D 13/0409 |
| | | | | 210/166 |
| 4,515,359 A * | 5/1985 | Mariol | | A63H 3/52 |
| | | | | 446/481 |
| 6,269,737 B1 * | 8/2001 | Rigney | | A47J 27/04 |
| | | | | 99/413 |
| 6,349,715 B1 * | 2/2002 | McBroom | | F24B 1/207 |
| | | | | 126/41 R |
| 6,532,865 B1 * | 3/2003 | Hoffman | | A47J 37/1285 |
| | | | | 99/410 |
| 8,616,121 B1 * | 12/2013 | Hansalik | | F24C 15/14 |
| | | | | 99/410 |
| 9,453,331 B1 * | 9/2016 | Buffington | | E03F 5/041 |
| 9,567,739 B2 * | 2/2017 | Nyce | | E03F 5/0407 |
| 9,777,489 B2 * | 10/2017 | Gomo | | E04F 17/00 |
| 10,458,658 B1 * | 10/2019 | Bradfield | | F24C 3/14 |
| 2001/0054358 A1 * | 12/2001 | Rigney | | A47J 27/04 |
| | | | | 99/410 |
| 2002/0092515 A1 * | 7/2002 | Lubrina | | F24C 3/103 |
| | | | | 126/39 B |
| 2003/0003209 A1 * | 1/2003 | Rigney | | A47J 27/04 |
| | | | | 426/438 |
| 2006/0289450 A1 * | 12/2006 | Craghead | | F24C 15/30 |
| | | | | 219/445.1 |
| 2007/0034577 A1 * | 2/2007 | Bayard | | E03F 5/06 |
| | | | | 210/163 |
| 2007/0157920 A1 * | 7/2007 | De Miranda Grieco | | F24C 15/10 |
| | | | | 126/211 |
| 2007/0209109 A1 * | 9/2007 | Meyers | | E03F 5/0408 |
| | | | | 4/613 |
| 2008/0277927 A1 * | 11/2008 | Mueller | | F16L 27/0808 |
| | | | | 285/272 |
| 2010/0101018 A1 * | 4/2010 | Chase | | E03C 1/055 |
| | | | | 700/282 |
| 2014/0352815 A1 * | 12/2014 | Brodey | | E03F 5/0409 |
| | | | | 137/544 |
| 2018/0087260 A1 * | 3/2018 | Priester | | E06B 1/70 |

FOREIGN PATENT DOCUMENTS

| | | | | |
|---|---|---|---|---|
| CN | 204373014 U | * | 6/2015 | |
| CN | 104864422 A | * | 8/2015 | |
| CN | 205804560 U | * | 12/2016 | |
| CN | 206128261 U | * | 4/2017 | |
| CN | 206320812 U | * | 7/2017 | |
| CN | 206512834 U | * | 9/2017 | |
| EP | 1041217 A1 | * | 10/2000 | ......... E04D 13/0409 |
| GB | 2282443 A | * | 4/1995 | ............ F24C 7/083 |
| JP | S62153426 A | * | 7/1987 | ............ A47B 77/02 |
| JP | H04136626 A | * | 5/1992 | |
| JP | 2003325248 A | * | 11/2003 | |
| JP | 2013002778 A | * | 1/2013 | |
| JP | 2014105878 A | * | 6/2014 | |
| JP | 5950801 B2 | * | 7/2016 | |
| KR | 200480855 Y1 | * | 7/2016 | |
| WO | WO-2008112814 A1 | * | 9/2008 | ............ E03F 5/0408 |
| WO | WO-2012024716 A1 | * | 3/2012 | ............ E03C 1/288 |
| WO | WO-2014186830 A1 | * | 11/2014 | ............ A47B 77/02 |
| WO | WO-2017168376 A1 | * | 10/2017 | ............ A47J 37/07 |

\* cited by examiner

COOKING APPLIANCE WITH INTEGRAL DRAIN

CROSS REFERENCE TO RELATED PATENT APPLICATIONS

This application claims priority to U.S. Patent Application Ser. No. 62/589,998 filed Nov. 22, 2017 entitled "Cooking Appliance With Integral Drain" by Chad Michael Cusimano, and to International Application Number PCT/US2018/061723 filed Nov. 19, 2018 the entire disclosures of which are incorporated herein by reference in their entirety.

FIELD OF THE INVENTION

This invention relates generally to cooking appliances, and more particularly to a cooking appliance with an integral drain.

BACKGROUND OF THE INVENTION

Cooking appliances have existed for many years, with both electric and gas cooktops and cooking appliances being commonplace today. With the advent of these modern cooking appliances, the layout of kitchens in most homes, while advancing in terms of size and finishing materials, has really not changed that much. Nearly all modern day kitchens have a refrigerator/freezer, countertops, a stove or range, an oven, and a sink. These are considered to be the basic essentials needed to prepare meals in the home. Of course there are a multitude of accessories related to appliances, lighting, and physical features that can be incorporated with these kitchen fundamentals. In addition, there are a significant number of choices related to the basics of refrigerator/freezer combinations, countertops, cooking appliances and sinks.

One of the more recent "advances" in some of the more high-end kitchens is the installation of a pot filler near the cooktop. The pot filler is a glorified faucet having a hose or similar adjustable extension so that a pot placed on the cooktop can be filled with water without the need to carry the pot over to the sink, fill it with water, and then carry it back to the cooktop for use. At roughly eight pounds per gallon, while a pot full of water is not significantly heavy, it can be challenging or inconvenient for some to move from the sink area of a kitchen to the cooktop.

While the movement of cold tap water from the sink to the cooktop can be inconvenient for some, the movement of boiling hot water from the cooktop to the sink for draining and disposal can not only be inconvenient, it can be dangerous for many, especially the elderly or those with limited physical abilities. The larger the pot, the more dangerous the transfer of boiling water from the cooktop to the sink becomes. Not only is there more boiling liquid contained in the larger pot, it weighs more and the boiling contents are more apt to move around as the pot is moved.

What is needed is an arrangement where the pot or cooking vessel can be drained of hot liquid without the need to pick it up from the cooktop and move it across the kitchen to the sink for disposal of the hot liquid contained within. Such an arrangement could be used in conjunction with a pot filler faucet to nearly eliminate the movement of a full pot between the sink and the cooktop, or could be used in conjunction with traditional approaches to filling a pot from the sink based faucet. Either way, eliminating the need to carry a pot of boiling hot liquid from the cooktop to the drain will prevent many burn injuries and the secondary result of a kitchen mess.

SUMMARY OF THE INVENTION

In accordance with the present invention, there is provided a cooking appliance with an integral drain comprising a generally planar surface having at least one burner there through; an inclined surface adjacent to the at least one burner; the inclined surface having an originating elevation, a terminating elevation and an opening; the terminating elevation of the inclined surface joining with a strainer; the strainer formed to the opening of the inclined surface and capable of connecting with a drain pipe.

The foregoing paragraph has been provided by way of introduction, and is not intended to limit the scope of the following claims.

BRIEF DESCRIPTION OF THE DRAWINGS

The invention will be described by reference to the following drawings, in which like numerals refer to like elements, and in which.

Figure 1:
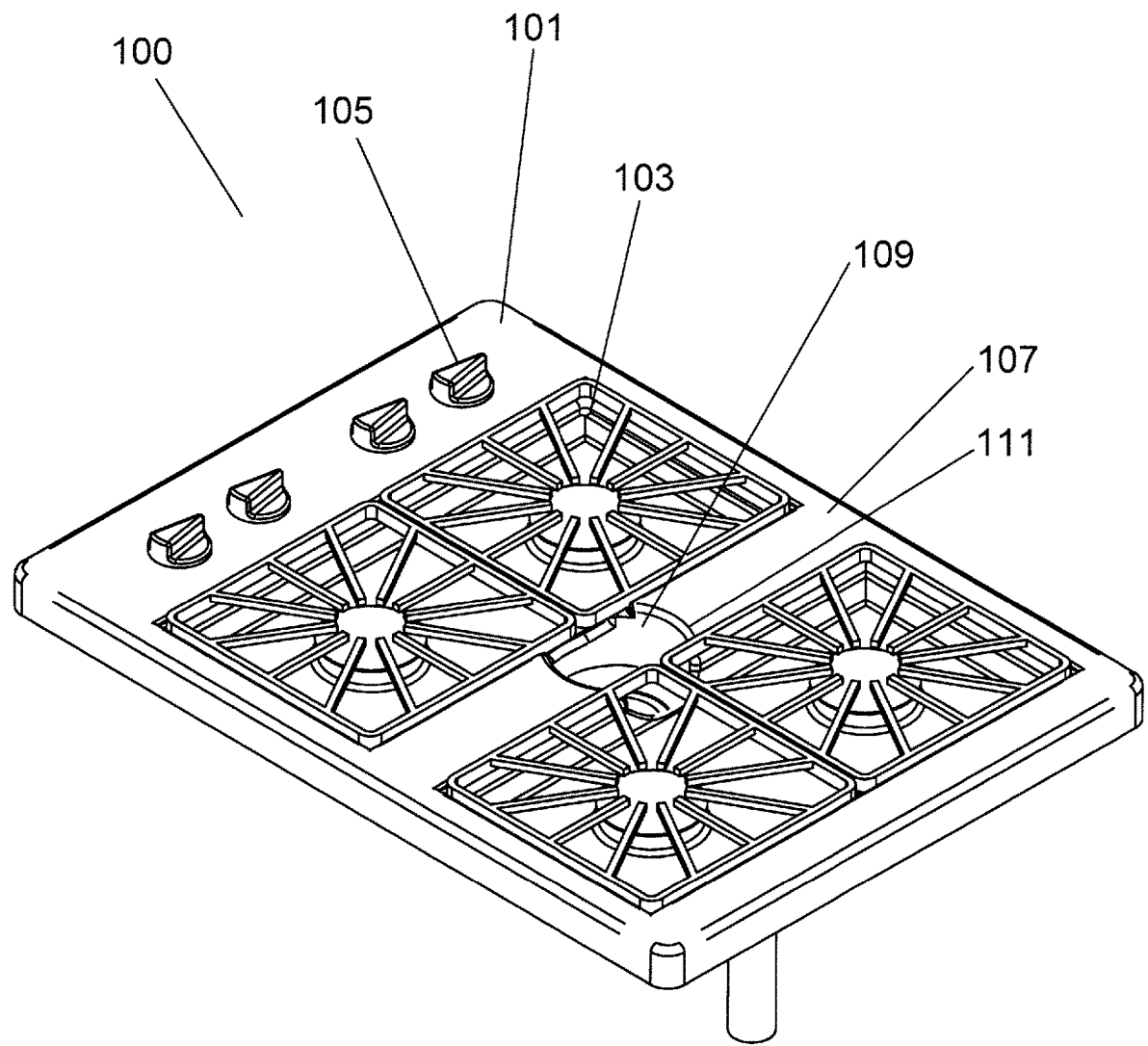
FIG. 1 is a perspective view of a cooking appliance with integral drain.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, drawings, and appended claims.

DESCRIPTION OF THE PREFERRED EMBODIMENTS

The cooking appliance with integral drain is described and depicted herein by way of several examples, as further illustrated in the attached figures. These examples are to be considered as just that, examples and not limitations. Other embodiments, variations and versions may be determined after reviewing this specification with the attached figures, these embodiments, variations and versions being included in the spirit and broad scope of the present invention.

For a general understanding of the present invention, reference is made to the drawings. In the drawings, like reference numerals have been used throughout to designate identical elements.

FIG. 1 is a perspective view of a cooking appliance with integral drain 100. FIGS. 1-7 depict this first embodiment. A surface 101, in most instances a generally planar surface to conform to a countertop or the like, can be seen. This surface 101 may be made from a material such as stainless steel, porcelain enamel coated steel, or the like, and may be formed by stamping and pressing or similar fabrication techniques. Placed through or formed with the surface 101 are burners 103. The burners may be gas fired burners, electric burners, or the like, and are operated from controls 105 that control the amount of heat provided to the burners 103. The controls 105 may be horizontally or vertically mounted, or may, in some embodiments of the present invention, be mounted in other orientations or locations. The cooking appliance may also comprise an oven to accompany the burners, and may in some embodiments be considered a range. Adjacent to at least one burner is a drain surface 107 that pitches downwardly toward a strainer 109 or similar drain feature by way of an inclined surface 111. The inclined surface has an originating elevation, a terminating elevation and an opening. The terminating elevation is lower than the originating elevation to allow liquids such as water to flow down the inclined surface into the strainer 109 or similar drain feature. The strainer 109 may be, for example, a traditional stainless steel device that is attached to or otherwise formed to the opening in the inclined surface and has a threaded portion to allow attachment of a drain pipe. The strainer 109 may also be a drain feature that is integrated with the inclined surface, for example, pressed or machined directly into the inclined surface. The strainer joins the terminating elevation of the inclined surface 111 to allow for proper drainage of liquids and the like. As seen in FIG. 1, in this embodiment the drain surface 107 forms an inclined surface 111 leading to the strainer 109 and associated drain. The surface of the cooktop 101 simply forms a drain surface 107 through inclination of the surface as it approaches the strainer 109. In some embodiments of the present invention, the strainer 109 may comprise an upwardly vertical structure such as a funnel or guide; such a structure being permanently, removably or retractably attached to the strainer 109.

Figure 2:
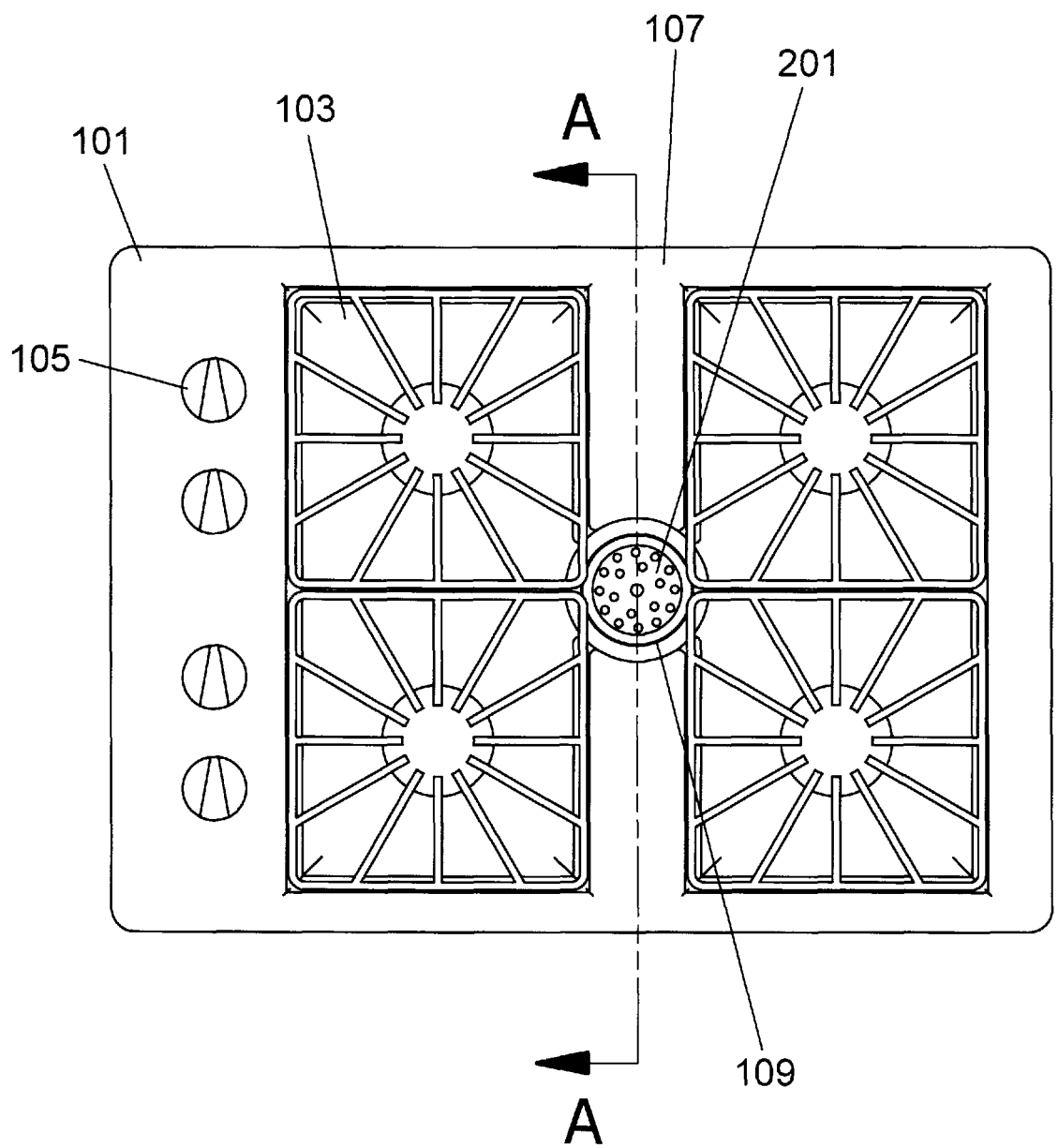
FIG. 2 is a top plan view of the cooking appliance with integral drain of FIG. 1.

FIG. 2 is a top plan view of the cooking appliance with integral drain of FIG. 1. The placement of the drain surface 107 close to at least one burner 103 can be seen. This allows for ease of draining of hot liquids such as water from a pot, or use of a drain pot as will be further described herein. A strainer basket 201 can also be seen placed within the strainer 109 to catch food debris. The strainer basket 201 is removable, contains holes or other such openings to allow water or liquids to pass, and is made from a metal aplastic, or the like.

Figure 3:
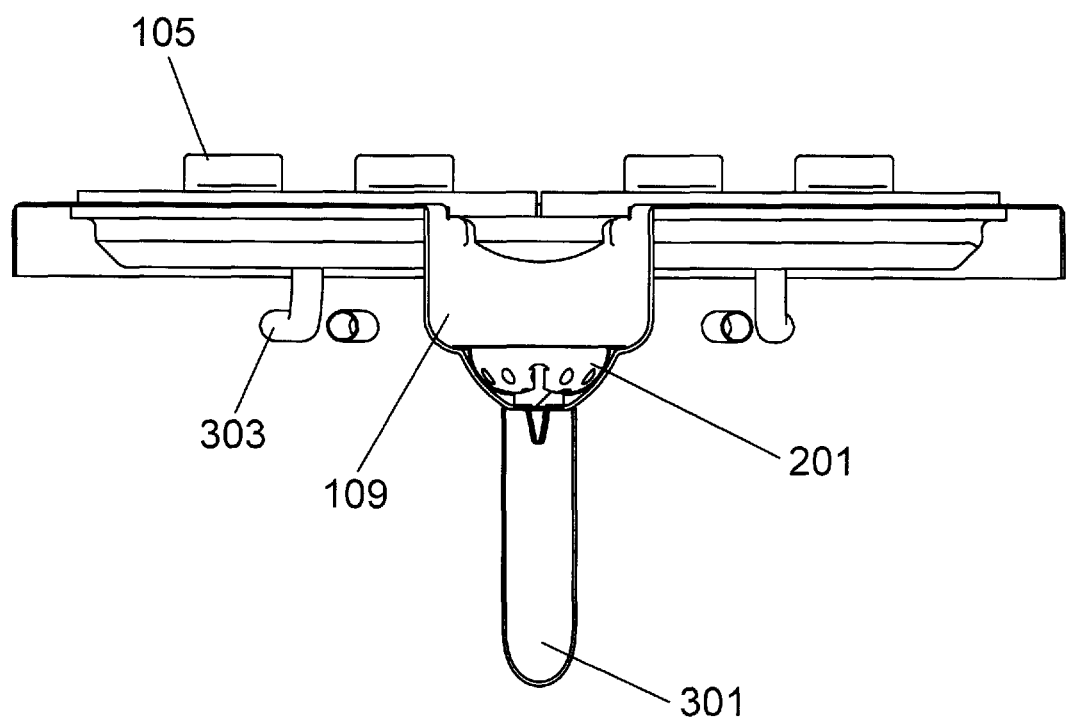
FIG. 3 is a cross sectional view of the cooking appliance with integral drain taken along line A-A of FIG. 2.

FIG. 3 is a cross sectional view of the cooking appliance with integral drain taken along line A-A of FIG. 2. While the incline of the drain surface is subtle and may be difficult to discern in FIG. 3, in some embodiments of the present invention the incline is more pronounced as it approaches the strainer 109. In some embodiments of the present invention, the incline may be absent entirely and the strainer 109 may be the sole receiver of liquid to be drained. Further, in some embodiments of the present invention the strainer 109 or other drainage feature may be larger or of differing geometries than that depicted by way of example in the figures. The drainage feature may be slotted, rectangular, or a long narrow opening at the bottom of a single pitch inclined surface. In FIG. 3, a drain pipe 301 can be seen connected to a lower portion of the strainer 109. Such a drain pipe would be placed and connected during installation of the cooktop with integral drain.

Figure 4:
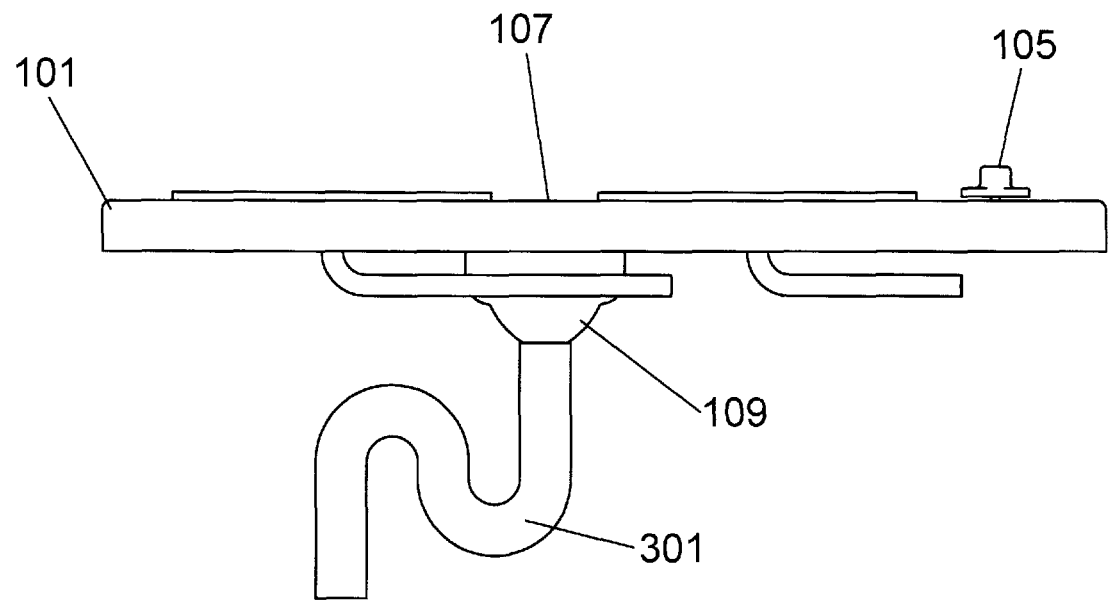
FIG. 4 is a side plan view of the cooking appliance with integral drain of FIG. 1.
Figure 5:
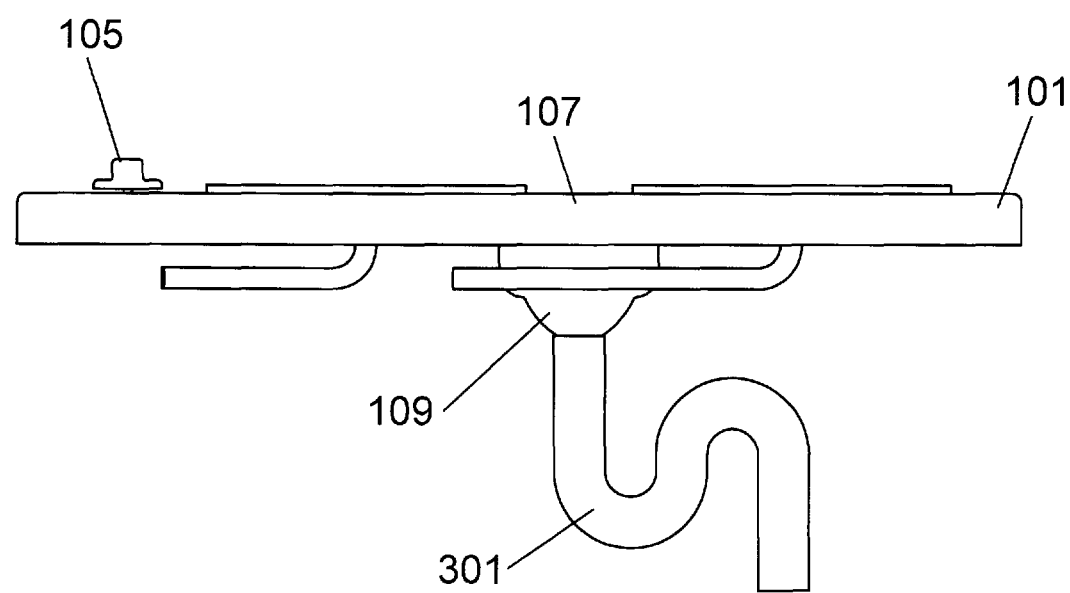
FIG. 5 is an alternate side plan view of the cooking appliance with integral drain of FIG. 1.
Figure 6:
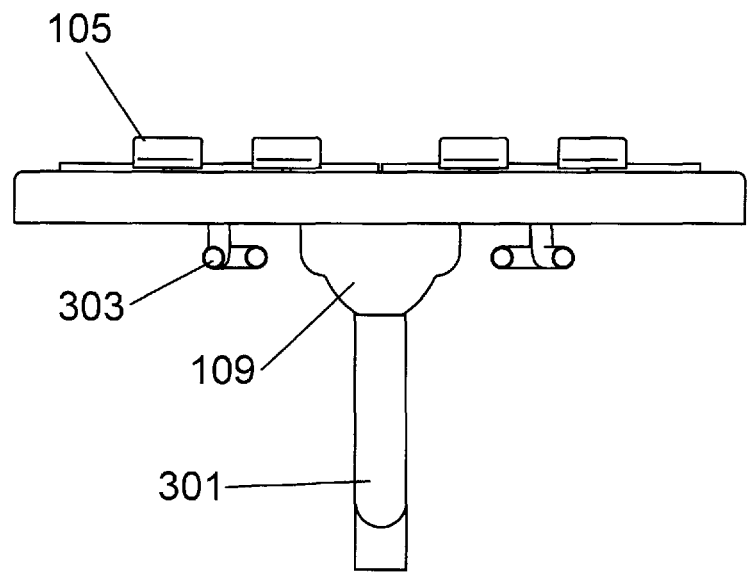
FIG. 6 is a rotated side plan view of the cooking appliance with integral drain of FIG. 1.
Figure 7:
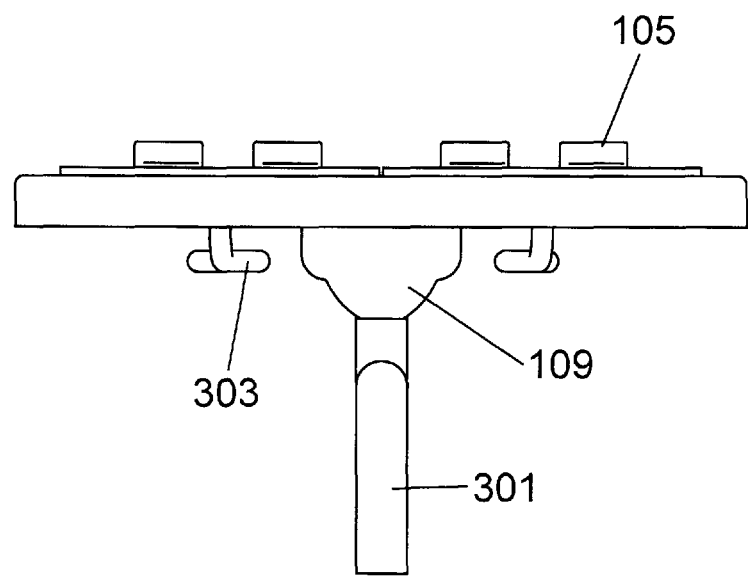
FIG. 7 is an alternate rotated side plan view of the cooking appliance with integral drain of FIG. 1.

FIG. 4 is a side plan view of the cooking appliance with integral drain of FIG. 1 and FIG. 5 is an alternate side plan view of the cooking appliance with integral drain of FIG. 1. FIG. 6 is a rotated side plan view of the cooking appliance with integral drain of FIG. 1. FIG. 7 is an alternate rotated side plan view of the cooking appliance with integral drain of FIG. 1.

As another example, FIGS. 8-15 depict a cooking appliance with integral drain with a drain perimeter 817 to encompass and contain any liquids poured into the drainage area of the cooktop.

Figure 8:
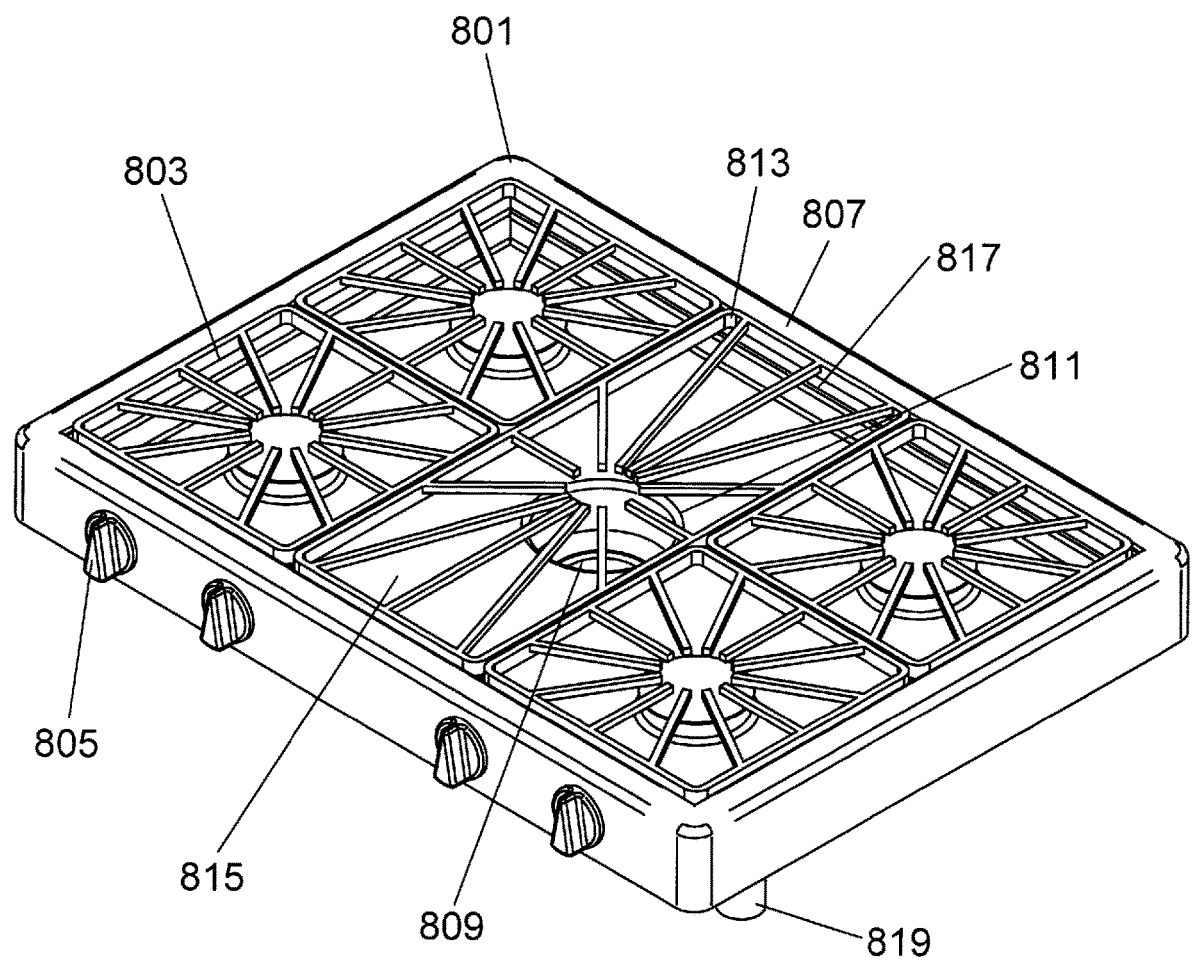
FIG. 8 is a perspective view of a further embodiment of the cooking appliance with integral drain.

FIG. 8 is a perspective view of a further embodiment of the cooking appliance with integral drain which shows a drain perimeter 817 that may, in some embodiments of the present invention, comprise a vertical or angled wall to contain liquids within the drain surface 815, down the inclined surface 811 and out the strainer 809 or other similar drain arrangement.

A surface 801, in most instances a generally planar surface to conform to a countertop or the like, can be seen. This surface 801 may be made from a material such as stainless steel, porcelain enamel coated steel, or the like, and may be formed by stamping and pressing or similar fabrication techniques. Placed through or formed with the surface 801 are burners 803. The burners may be gas fired burners, electric burners, or the like, and are operated from controls 805 that control the amount of heat provided to the burners 803. The controls 805 may be horizontally or vertically mounted, or may, in some embodiments of the present invention, be mounted in other orientations or locations. Adjacent to at least one burner is a drain surface 815 that pitches downwardly toward a strainer 809 or similar drain feature by way of an inclined surface 811. The inclined surface has an originating elevation, a terminating elevation and an opening. The terminating elevation is lower than the originating elevation to allow liquids such as water to flow down the inclined surface into the strainer 809 or similar drain feature. The strainer 809 may be, for example, a traditional stainless steel device that is attached to or otherwise formed to the opening in the inclined surface and has a threaded portion to allow attachment of a drain pipe 819. The strainer 809 may also be a drain feature that is integrated with the inclined surface, for example, pressed or machined directly into the inclined surface. The strainer joins the terminating elevation of the inclined surface 811 to allow for proper drainage of liquids and the like. As seen in FIG. 8, in this embodiment the drain surface 815 is surrounded by a drain perimeter 817 to contain liquid as it travels down the inclined surface 811 to the strainer 809 and associated drain. The surface of the cooktop 801 has a cooktop perimeter 807 that surrounds the burners and the drain surface. The drain surface 815 may be adjacent to a burner 803, and may, in some embodiments of the present invention, be rectangular, square, or the like. The drain surface 815 may also, in some embodiments of the present invention, be covered by a drain grating 813 that may also be, in some embodiments of the present invention, removable. The drain grating 813 may be made from a metal or other heat resistant material, and may, in some embodiments of the present invention, be similar to the gratings applied to the burners 803 in the case of gas fired burners.

Figure 9:
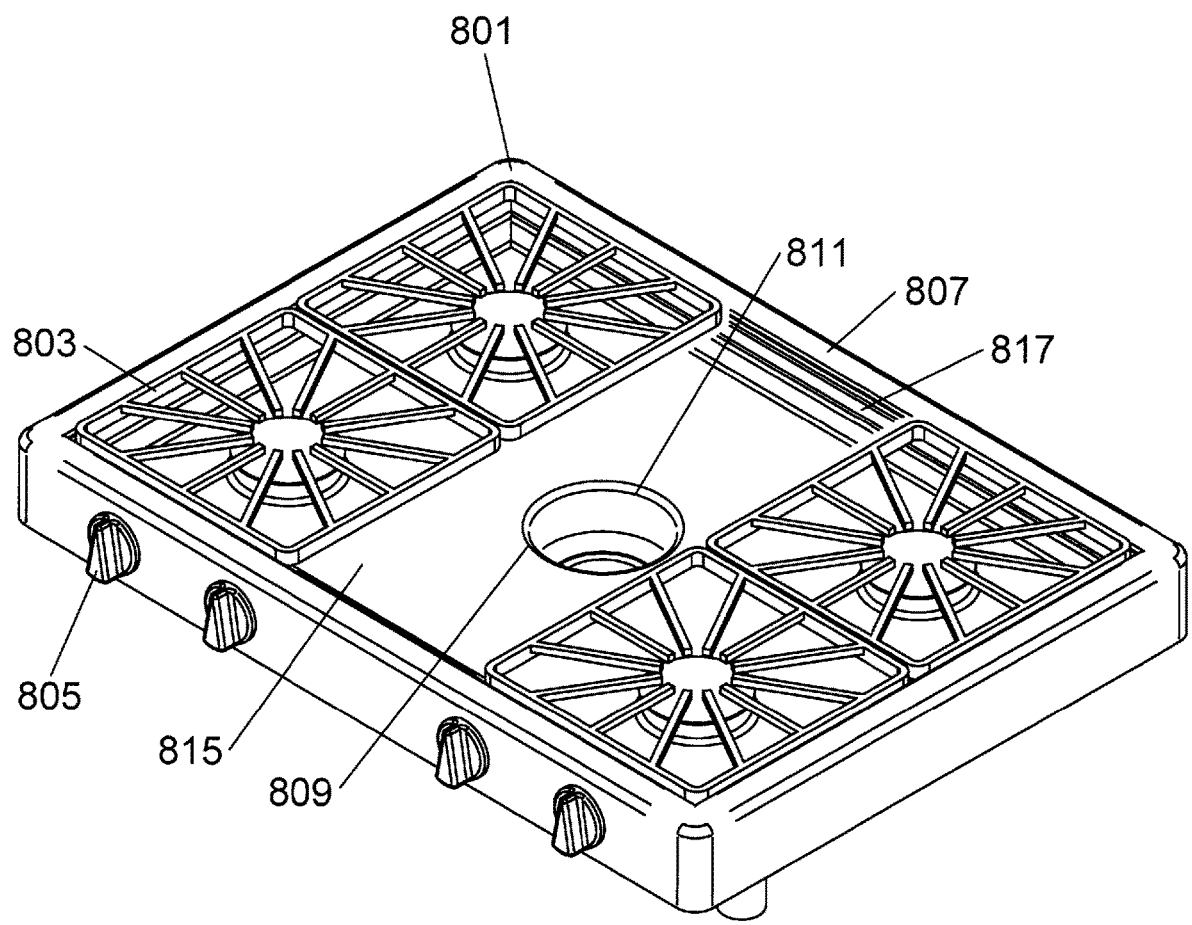
FIG. 9 is a perspective view of the cooking appliance with integral drain of FIG. 8, but with a grate removed.

FIG. 9 is a perspective view of the cooking appliance with integral drain of FIG. 8, but with a grate removed. As can be seen, the drain surface in this example is rectangular and the drain perimeter 817 has a generally vertical wall with a step or recess to accommodate the drain grating 813 (shown in FIG. 8). The strainer 809 can also be clearly seen with an inclined surface 811 leading towards it.

Figure 10:
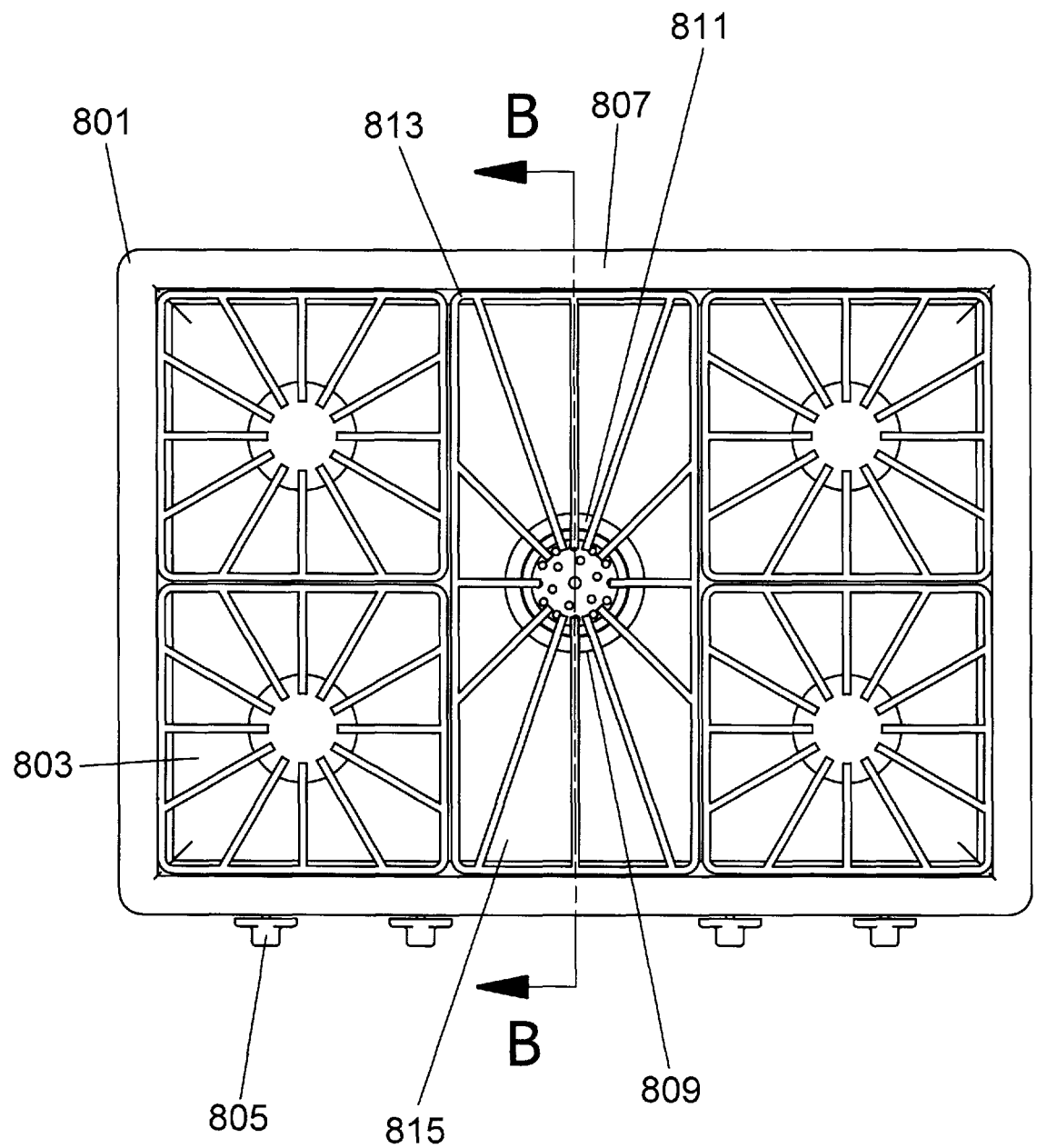
FIG. 10 is a top plan view of the cooking appliance with integral drain of FIG. 8.

FIG. 10 is a top plan view of the cooking appliance with integral drain of FIG. 8. The placement of the drain surface 815 close to at least one burner 803 can be seen. This allows for ease of draining of hot liquids such as water from a pot, or use of a drain pot as will be further described herein. A strainer basket can also be seen placed within the strainer 809 to catch food debris. The strainer basket is removable, contains holes or other such openings to allow water or liquids to pass, and is made from a metal, a plastic, or the like.

Figure 11:
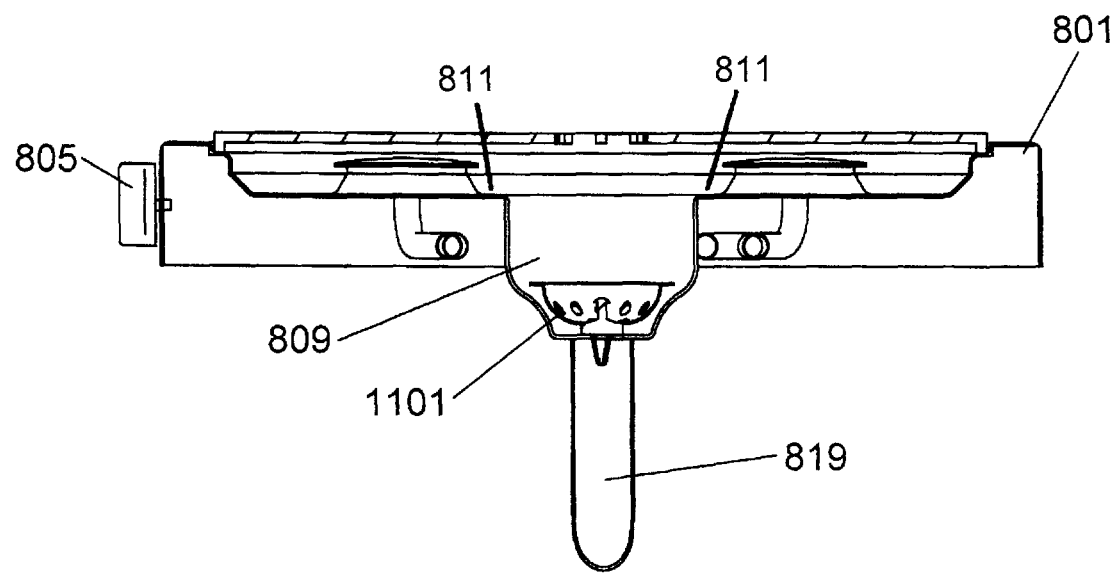
FIG. 11 is across sectional view of the cooking appliance with integral drain taken along line B-B of FIG. 10.

FIG. 11 is a cross sectional view of the cooking appliance with integral drain taken along line B-B of FIG. 10. While the incline of the drain surface is subtle and may be difficult to discern in FIG. 11, in some embodiments of the present invention the incline is more pronounced as it approaches the strainer 809. In some embodiments of the present invention, the incline may be absent entirely and the strainer 809 may be the sole receiver of liquid to be drained. Further, in some embodiments of the present invention the strainer 809 or other drainage feature may be larger or of differing geometries than that depicted by way of example in the figures. The drainage feature may be slotted, rectangular, or a long narrow opening at the bottom of a single pitch inclined surface. In FIG. 11, a drain pipe 819 can be seen connected to a lower portion of the strainer 809. Such a drain pipe would be placed and connected during installation of the cooktop with integral drain. A strainer basket 1101 can also be seen within the strainer 809.

Figure 12:
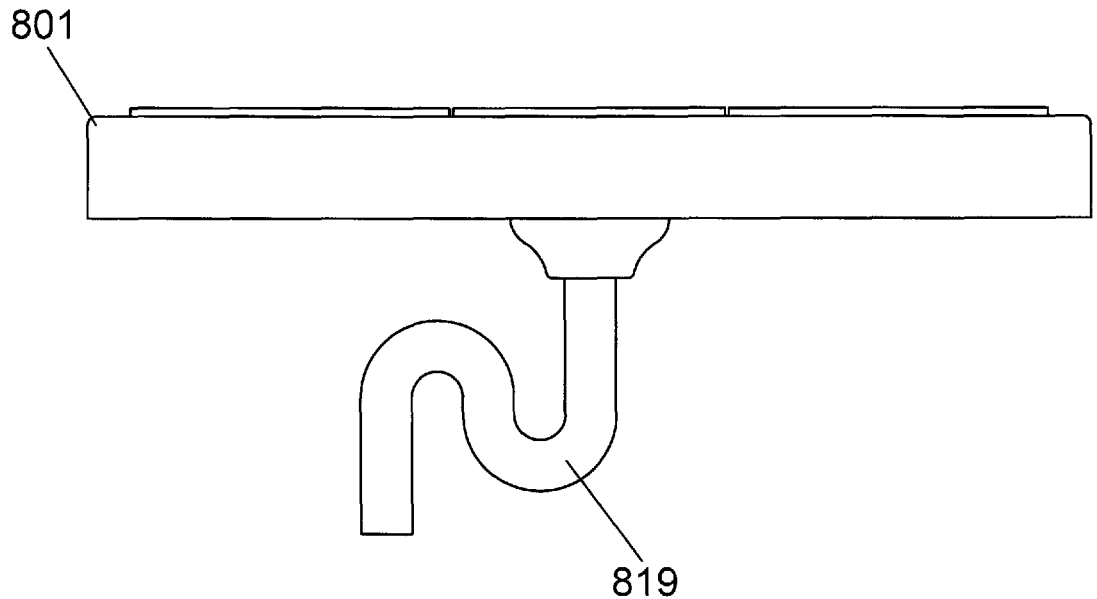
FIG. 12 is a side plan view of the cooking appliance with integral drain of FIG. 8.
Figure 13:
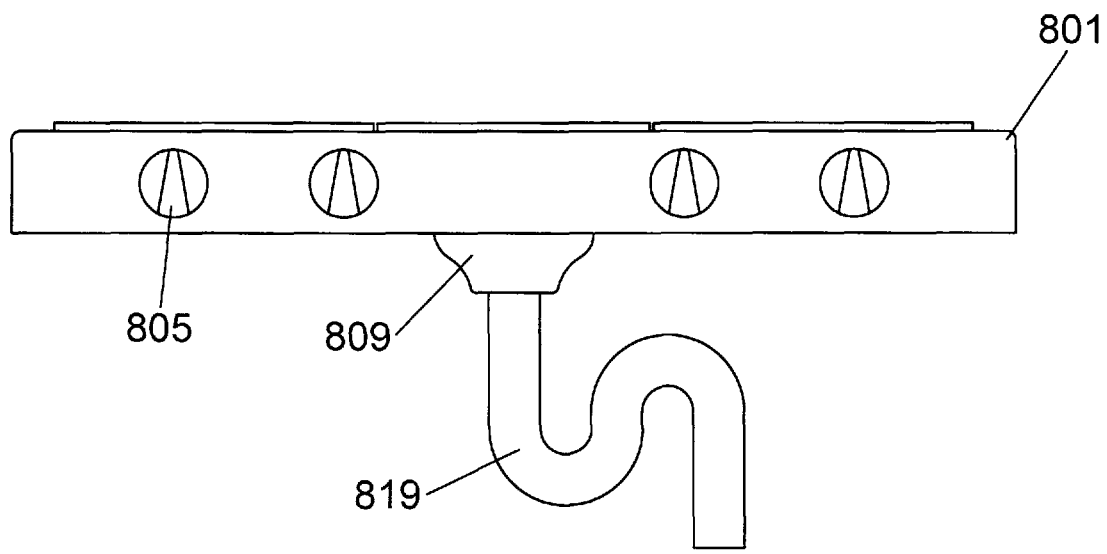
FIG. 13 is an alternate side plan view of the cooking appliance with integral drain of FIG. 8.
Figure 14:
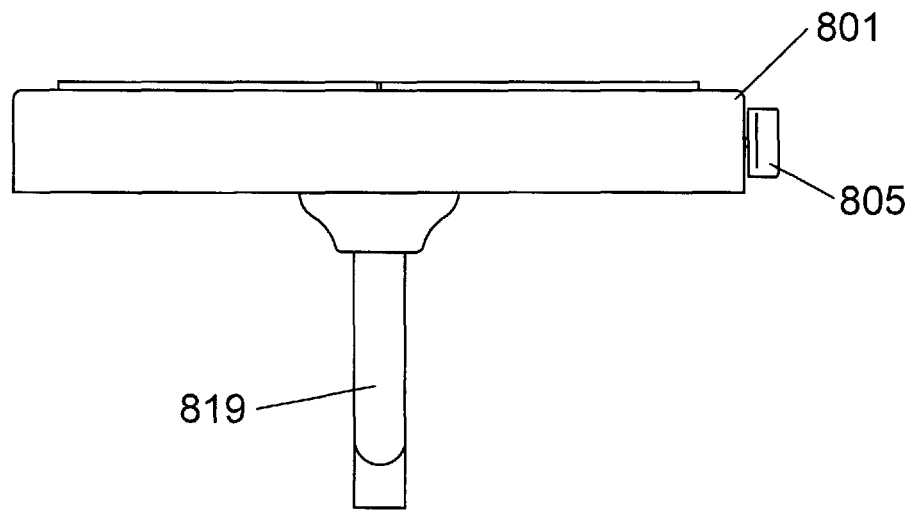
FIG. 14 is a rotated side plan view of the cooking appliance with integral drain of FIG. 8.
Figure 15:
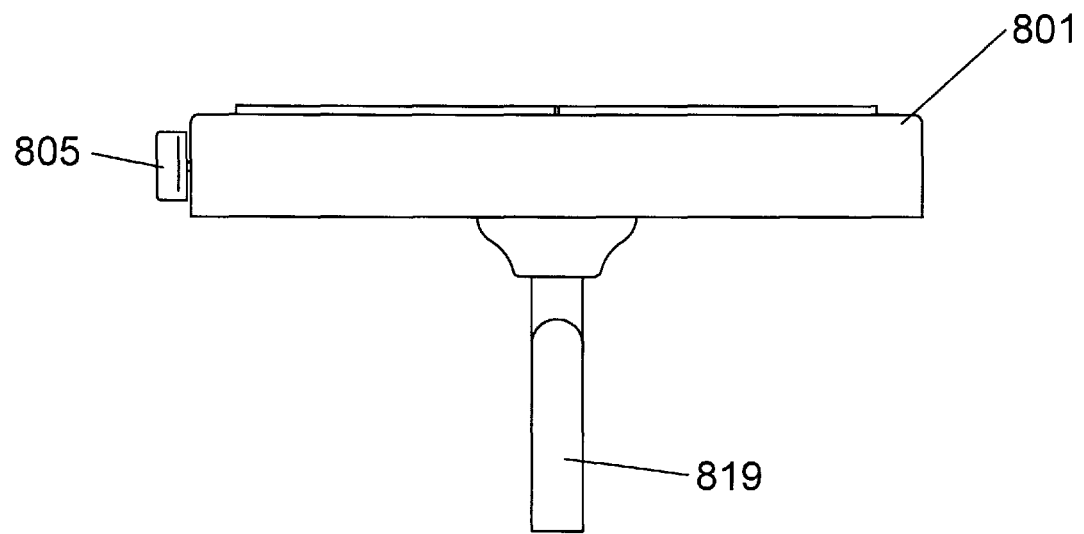
FIG. 15 is an alternate rotated side plan view of the cooking appliance with integral drain of FIG. 8.

FIG. 12 is a side plan view of the cooking appliance with integral drain of FIG. 8 and FIG. 13 is an alternate side plan view of the cooking appliance with integral drain of FIG. 8. FIG. 14 is a rotated side plan view of the cooking appliance with integral drain of FIG. 8. FIG. 15 is an alternate rotated side plan view of the cooking appliance with integral drain of FIG. 8.

As another example, FIGS. 16-23 depict a cooking appliance with integral drain with a drain perimeter 1617 to encompass and contain any liquids poured into the drainage area of the cooktop and a drain grating 1613 with parallel grate elements.

Figure 16:
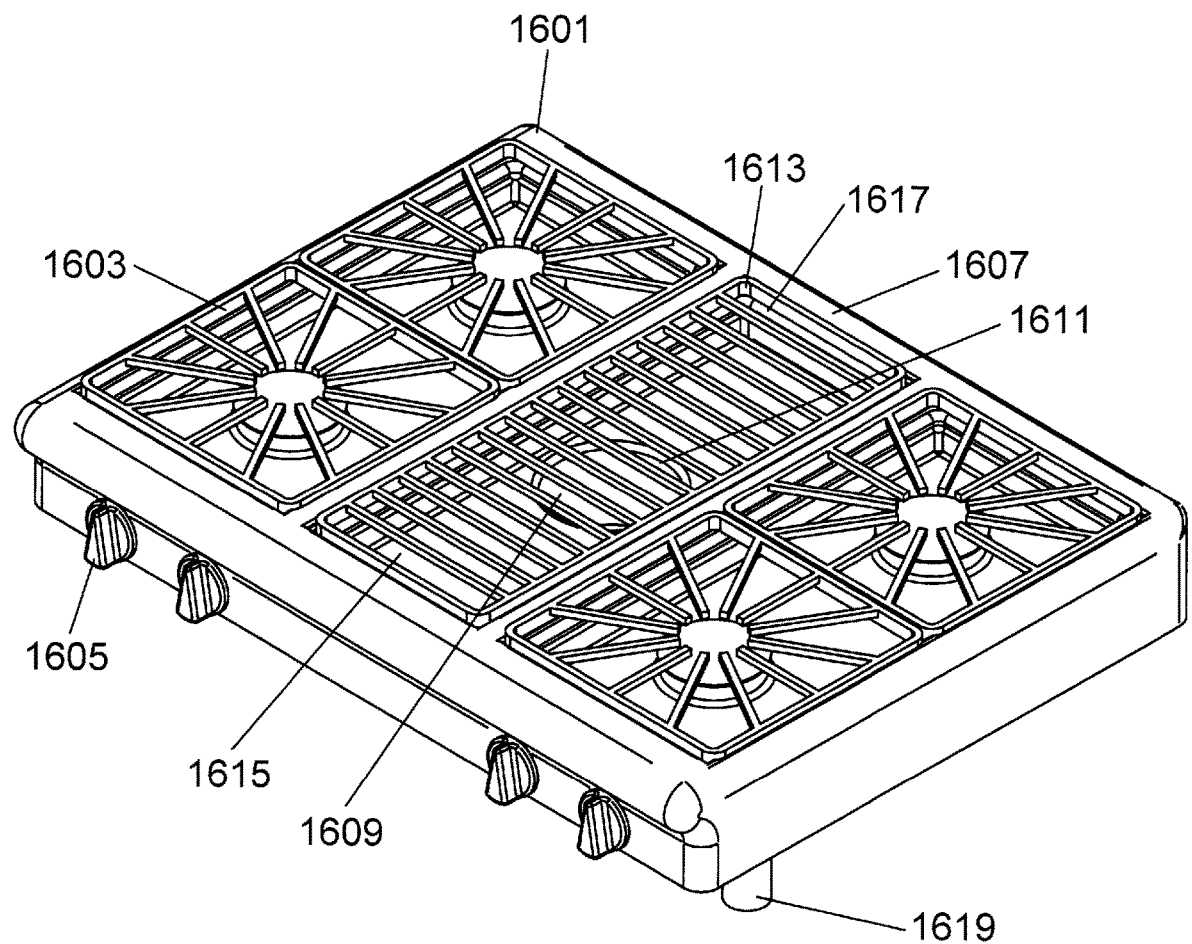
FIG. 16 is a perspective view of a further embodiment of the cooking appliance with integral drain.

FIG. 16 is a perspective view of a further embodiment of the cooking appliance with integral drain which shows a drain perimeter 1617 that may, in some embodiments of the present invention, comprise a vertical or angled wall to contain liquids within the drain surface 1615, down the inclined surface 1611 and out the strainer 1609 or other similar drain arrangement.

A surface 1601, in most instances a generally planar surface to conform to a countertop or the like, can be seen. This surface 1601 may be made from a material such as stainless steel, porcelain enamel coated steel, or the like, and may be formed by stamping and pressing or similar fabrication techniques. Placed through or formed with the surface 1601 are burners 1603. The burners may be gas fired burners, electric burners, or the like, and are operated from controls 1605 that control the amount of heat provided to the burners 1603. The controls 1605 may be horizontally or vertically mounted, or may, in some embodiments of the present invention, be mounted in other orientations or locations. Adjacent to at least one burner is a drain surface 1615 that pitches downwardly toward a strainer 1609 or similar drain feature by way of an inclined surface 1611. The inclined surface has an originating elevation, a terminating elevation and an opening. The terminating elevation is lower than the originating elevation to allow liquids such as water to flow down the inclined surface into the strainer 1609 or similar drain feature. The strainer 1609 may be, for example, a traditional stainless steel device that is attached to or otherwise formed to the opening in the inclined surface and has a threaded portion to allow attachment of a drain pipe 1619. The strainer 1609 may also be a drain feature that is integrated with the inclined surface, for example, pressed or machined directly into the inclined surface. The strainer joins the terminating elevation of the inclined surface 1611 to allow for proper drainage of liquids and the like. As seen in FIG. 16, in this embodiment the drain surface 1615 is surrounded by a drain perimeter 1617 to contain liquid as it travels down the inclined surface 1611 to the strainer 1609 and associated drain. The surface of the cooktop 1601 has a cooktop perimeter 1607 that surrounds the burners and the drain surface. The drain surface 1615 may be adjacent to a burner 1603, and may, in some embodiments of the present invention, be rectangular, square, or the like. The drain surface 1615 may also, in some embodiments of the present invention, be covered by a drain grating 1613 that may also be, in some embodiments of the present invention, removable. The drain grating 813 may be made from a metal or other heat resistant material, and may, in some embodiments of the present invention, comprise a plurality of grating elements that may, in some embodiments of the present invention, be parallel to each other.

Figure 17:
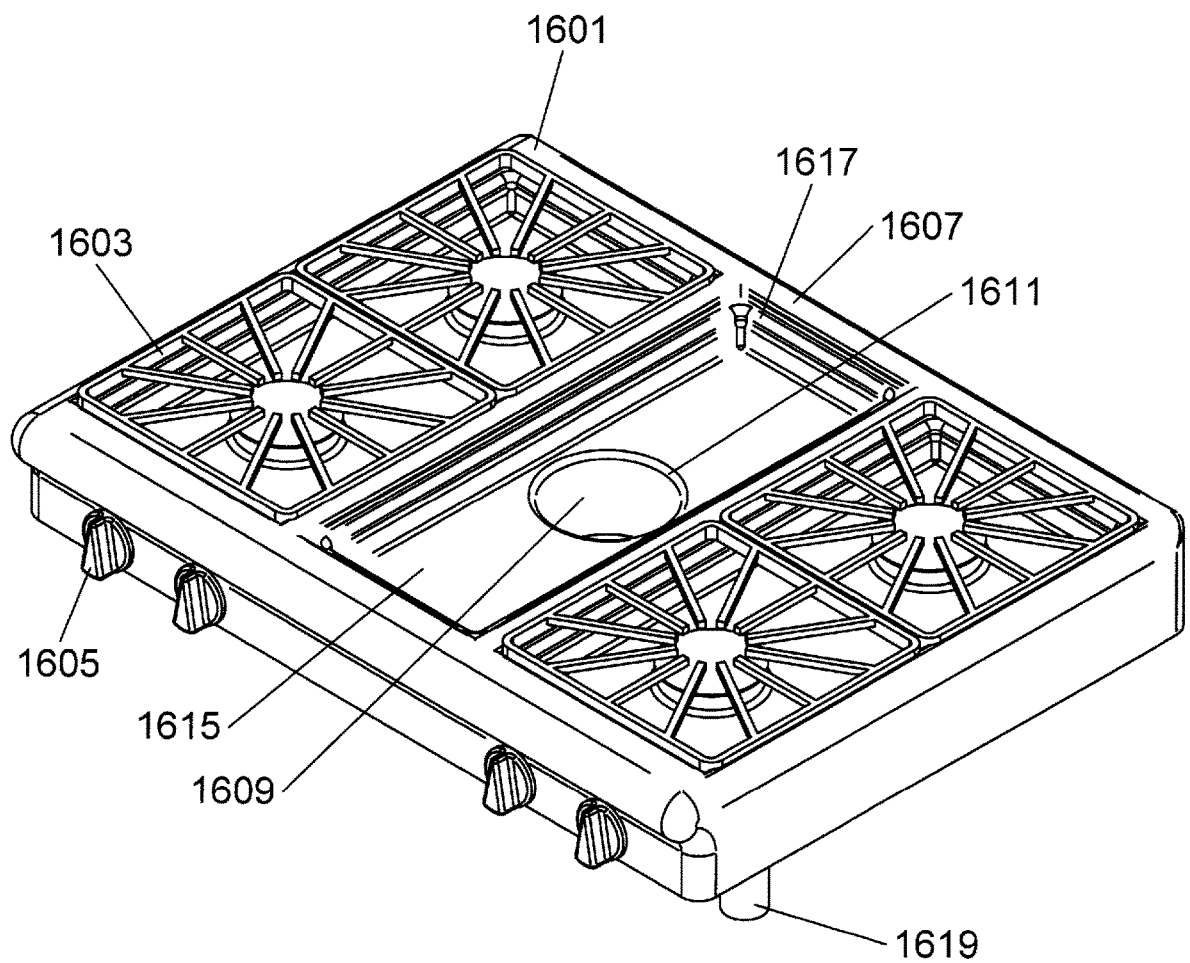
FIG. 17 is a perspective view of the cooking appliance with integral drain of FIG. 16, but with a grate removed.

FIG. 17 is a perspective view of the cooking appliance with integral drain of FIG. 16, but with a grate removed. As can be seen, the drain surface in this example is rectangular and the drain perimeter 1617 has a generally vertical wall with a step or recess to accommodate the drain grating 1613 (shown in FIG. 16). The strainer 1609 can also be clearly seen with an inclined surface 1611 leading towards it.

Figure 18:
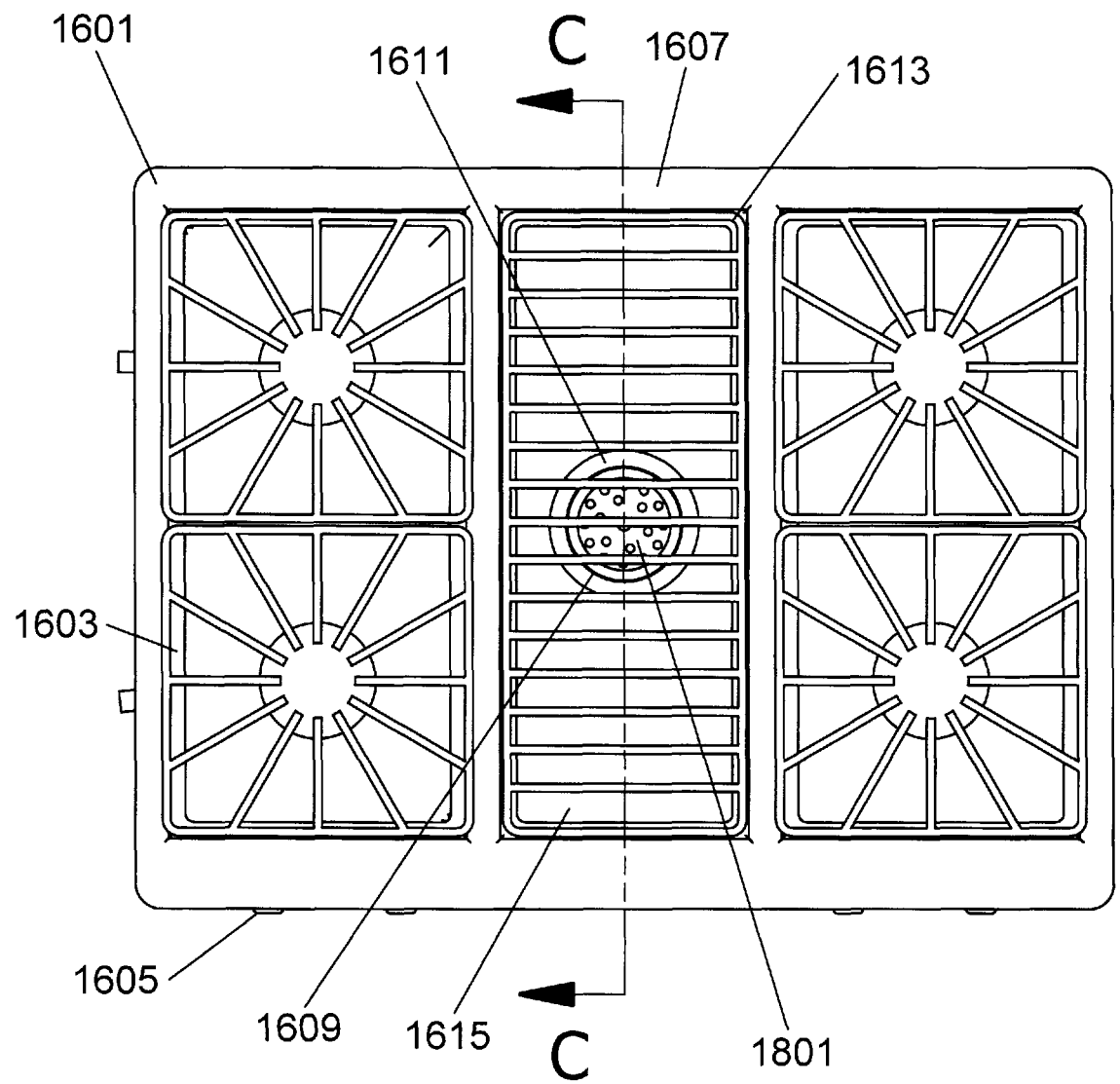
FIG. 18 is a top plan view of the cooking appliance with integral drain of FIG. 16.

FIG. 18 is a top plan view of the cooking appliance with integral drain of FIG. 16. The placement of the drain surface 1615 close to at least one burner 1603 can be seen. This allows for ease of draining of hot liquids such as water from a pot, or use of a drain pot as will be further described herein. A strainer basket 1801 can also be seen placed within the strainer 1609 to catch food debris. The strainer basket is removable, contains holes or other such openings to allow water or liquids to pass, and is made from a metal, a plastic, or the like.

Figure 19:
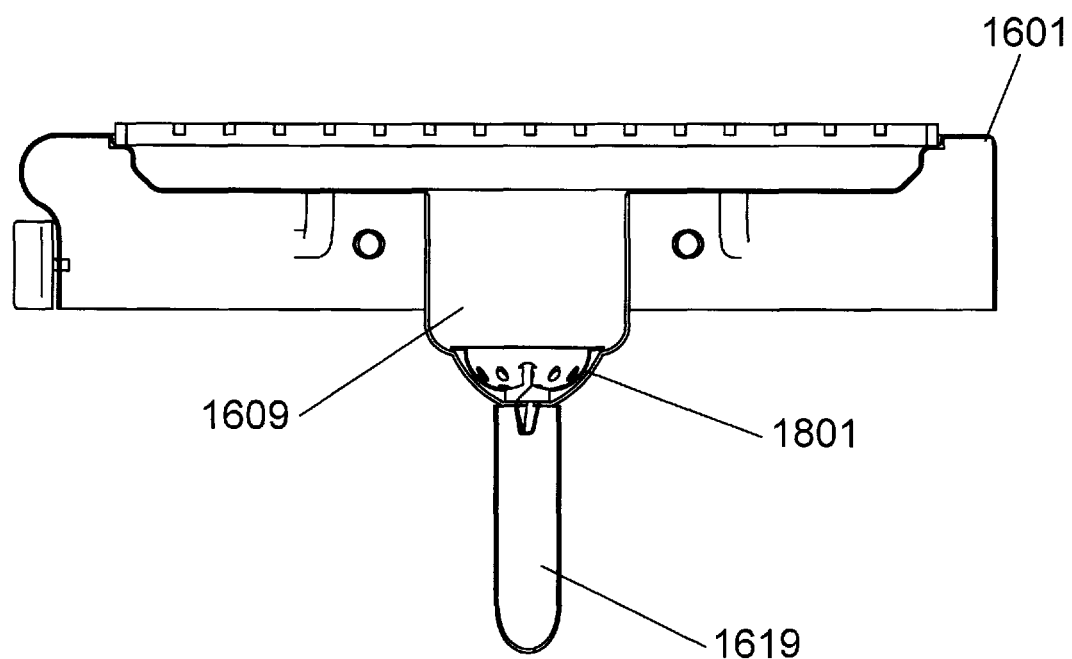
FIG. 19 is across sectional view of the cooking appliance with integral drain taken along line C-C of FIG. 18.

FIG. 19 is a cross sectional view of the cooking appliance with integral drain taken along line C-C of FIG. 18. While the incline of the drain surface is subtle and may be difficult to discern in FIG. 19, in some embodiments of the present invention the incline is more pronounced as it approaches the strainer 1609. In some embodiments of the present invention, the incline may be absent entirely and the strainer 1609 may be the sole receiver of liquid to be drained. Further, in some embodiments of the present invention the strainer 1609 or other drainage feature may be larger or of differing geometries than that depicted by way of example in the figures. The drainage feature may be slotted, rectangular, or a long narrow opening at the bottom of a single pitch inclined surface. In FIG. 19, a drain pipe 1619 can be seen connected to a lower portion of the strainer 1609. Such a drain pipe would be placed and connected during installation of the cooktop with integral drain. A strainer basket 1801 can also be seen within the strainer 1609.

Figure 20:
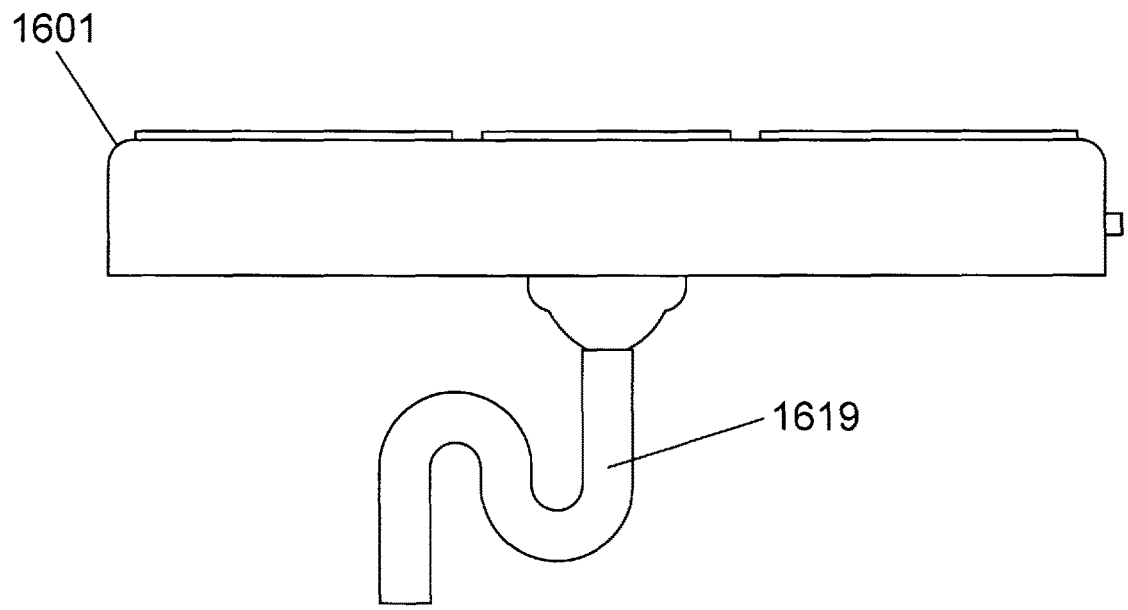
FIG. 20 is a side plan view of the cooking appliance with integral drain of FIG. 16.
Figure 21:
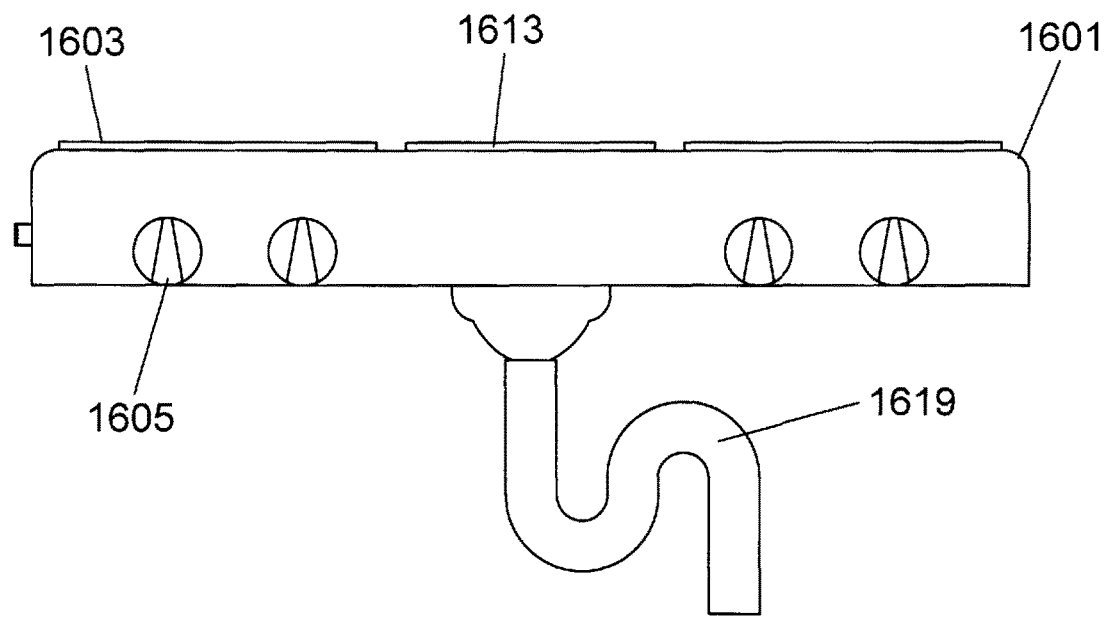
FIG. 21 is an alternate side plan view of the cooking appliance with integral drain of FIG. 16.
Figure 22:
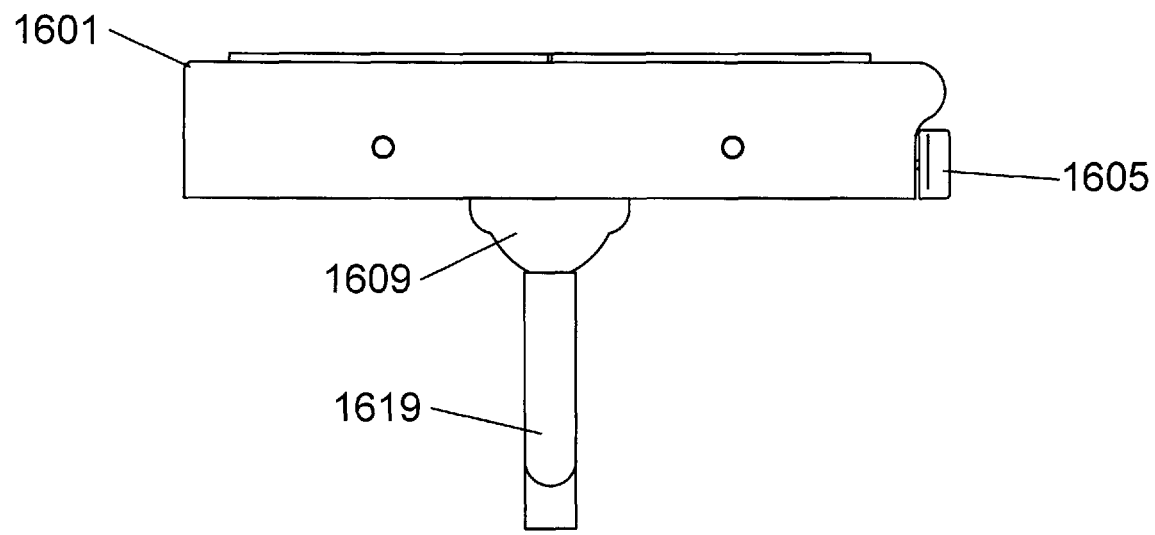
FIG. 22 is a rotated side plan view of the cooking appliance with integral drain of FIG. 16.
Figure 23:
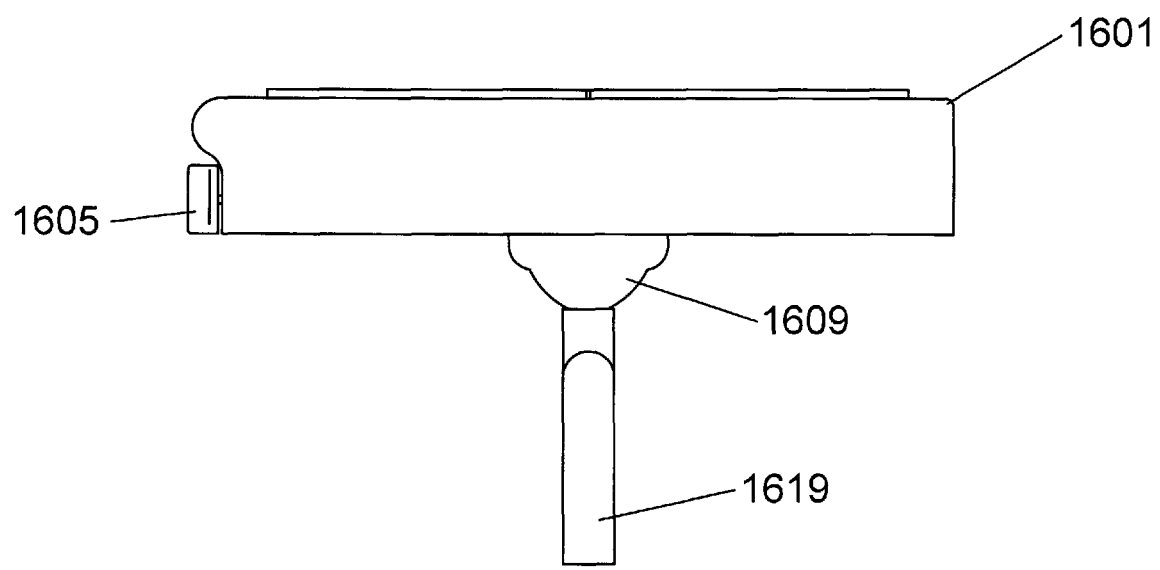
FIG. 23 is an alternate rotated side plan view of the cooking appliance with integral drain of FIG. 16.

FIG. 20 is a side plan view of the cooking appliance with integral drain of FIG. 16 and FIG. 21 is an alternate side plan view of the cooking appliance with integral drain of FIG. 16. FIG. 22 is a rotated side plan view of the cooking appliance with integral drain of FIG. 16. FIG. 23 is an alternate rotated side plan view of the cooking appliance with integral drain of FIG. 16.

Figure 24:
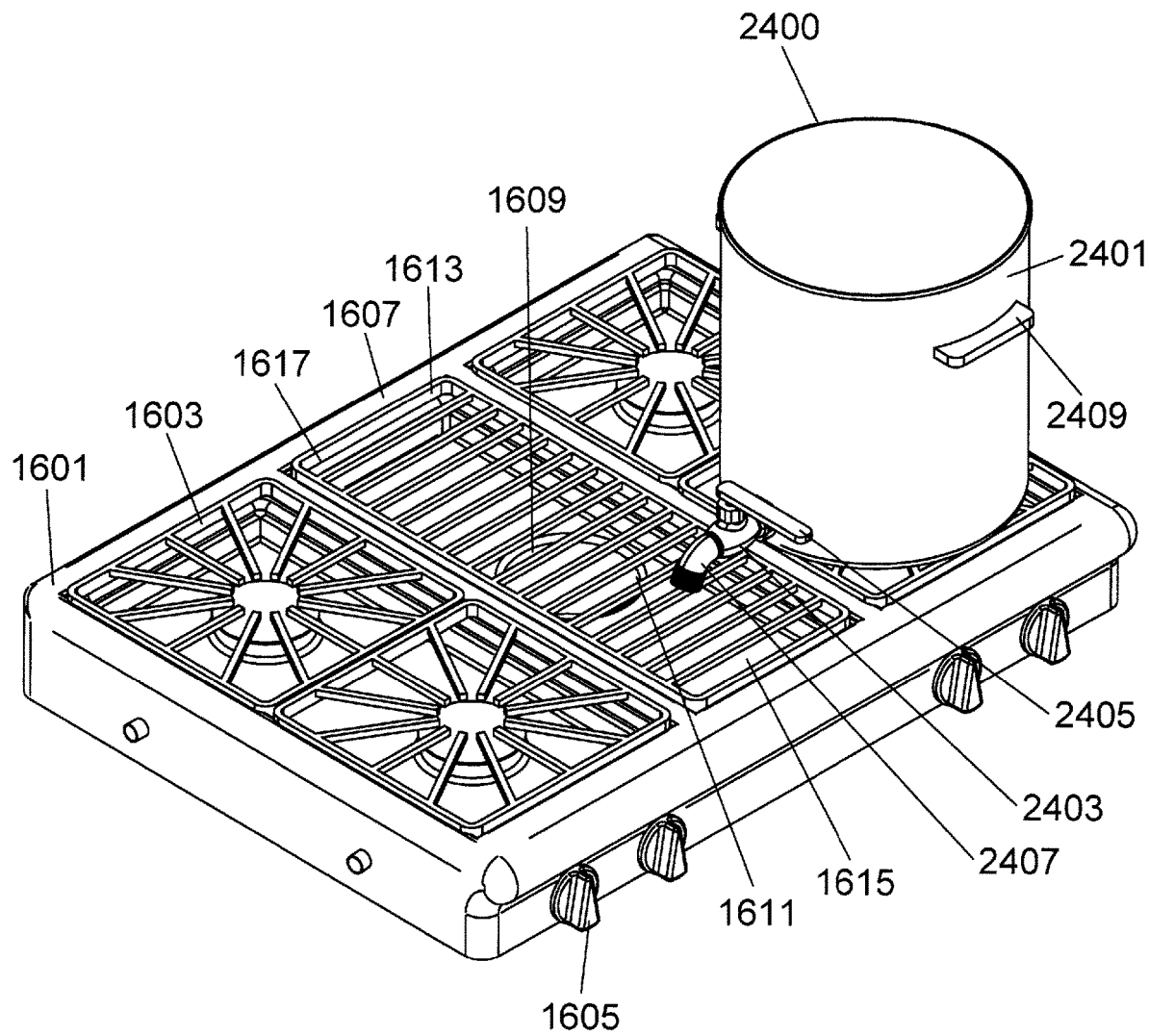
FIG. 24 is a perspective view of an embodiment of the cooking appliance with integral drain depicted in use with a drain pot of the present invention.

Lastly, FIG. 24 is a perspective view of an embodiment of the cooking appliance with integral drain depicted in use with a drain pot 2400. The drain pot illustrates how to use the cooking appliance with integral drain, however, a traditional pot or cooking vessel can also be used, with unwanted liquid being poured into the drainage surface either directly, or through a colander, strainer, or the like. The drain grating 1613 allows the colander or strainer to sit above the drain while cooked food is poured into the colander or strainer for removal of liquid.

The drain pot 2400 is a cooking vessel for heating food and water. A drain valve 2403 is placed through a lower portion of the vessel. The drain valve 2403 may be a ball valve, stem valve, or the like. A drain outlet 2407 is fluidically coupled to the drain valve 2403. A drain handle 2405 is mechanically coupled to the drain valve and allows a user to move the drain valve 2403 from closed to open and vice versa. The drain outlet 2407 may be angled or otherwise formed to direct hot liquid downward into the drain arrangement of the cooktop of the present invention. The drain pot 2400 may also have handles 2409 for ease of use.

It is, therefore, apparent that there has been provided, in accordance with the various objects of the present invention, a cooking appliance with integral drain. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A cooking appliance with integral drain comprising:
a generally planar surface having at least one burner there through;
a drain surface adjacent to the at least one burner and surrounded by a drain perimeter;
wherein the drain perimeter defines the boundary of the drain surface, and the at least one burner is outside of the defined drain surface;
wherein the drain surface pitches downwardly toward a strainer; and
wherein the drain surface comprises an inclined surface formed through inclination of the generally planar surface as it approaches the strainer and is adjacent to the at least one burner;
the inclined surface having an originating elevation, a terminating elevation and an opening;
wherein the inclined surface is exposed to allow for the ready draining of a cooking vessel;
the originating elevation of the inclined surface beginning at the drain surface;
the terminating elevation of the inclined surface joining with and fully surrounding the strainer;
the strainer formed to the opening of the inclined surface and capable of connecting with a drain pipe.

2. The cooking appliance with integral drain as recited in claim 1, further comprising controls for adjusting heat that is released from the at least one burner.

3. The cooking appliance with integral drain as recited in claim 2, wherein the controls are horizontally mounted.

4. The cooking appliance with integral drain as recited in claim 2, wherein the controls are vertically mounted.

5. The cooking appliance with integral drain as recited in claim 1, wherein said drain perimeter defines a rectangular trough.

6. The cooking appliance with integral drain as recited in claim 1, wherein said drain perimeter is a vertical wall to contain liquid that is poured within the drain perimeter.

7. The cooking appliance with integral drain as recited in claim 1, further comprising a drain grating over the drain perimeter.

8. The cooking appliance with integral drain as recited in claim 1, further comprising a drain grating over the strainer.

9. The cooking appliance with integral drain as recited in claim 1, wherein the at least one burner is a gas fired burner.

10. The cooking appliance with integral drain as recited in claim 1, wherein the at least one burner is an electric burner.

11. The cooking appliance with integral drain as recited in claim 1, further comprising a cooktop perimeter surrounding the at least one burner and the strainer.

12. The cooking appliance with integral drain as recited in claim 1, further comprising a strainer basket capable of insertion in the strainer to prevent food particles from entering the drain pipe.

13. The cooking appliance with integral drain as recited in claim 1, further comprising a water connection for cleaning the inclined surface and the strainer.

14. A cooking appliance with integral drain comprising:
a generally planar surface having at least one burner there through;
a drain surface adjacent to the at least one burner and surrounded by a drain perimeter;
wherein the drain perimeter defines the boundary of the drain surface, and the at least one burner is outside of the defined drain surface;
wherein the drain surface pitches downwardly toward a strainer; and
wherein the drain surface comprises an inclined surface formed through inclination of the generally planar surface as it approaches the strainer and is adjacent to the at least one burner;
the inclined surface having an originating elevation, a terminating elevation and an opening;

wherein the inclined surface is exposed to allow for the ready draining of a cooking vessel;
the originating elevation of the inclined surface beginning at the drain surface;
the terminating elevation of the inclined surface joining with and fully surrounding the strainer;
the strainer formed to the opening of the inclined surface and capable of connecting with a drain pipe; and
a drain pot comprising a vessel for heating food and water, a drain valve placed through a lower portion of the vessel, a drain outlet fluidically coupled to the drain valve, and a drain handle mechanically coupled to the drain valve.

15. The cooking appliance with integral drain as recited in claim 14, wherein said drain perimeter defines a rectangular trough.

16. The cooking appliance with integral drain as recited in claim 12, wherein said drain perimeter is a vertical wall to contain liquid that is poured within the drain perimeter.

17. The cooking appliance with integral drain as recited in claim 12, further comprising a drain grating over the drain perimeter.

18. A cooking appliance with integral drain comprising:
a generally planar surface having at least one burner there through;
a drain surface adjacent to the at least one burner and surrounded by a drain perimeter;
wherein the drain perimeter defines the boundary of the drain surface, and the at least one burner is outside of the defined drain surface;
wherein the drain surface pitches downwardly toward a strainer; and
wherein the drain surface comprises an inclined surface formed through inclination of the generally planar surface as it approaches the strainer and is adjacent to the at least one burner;
the inclined surface having an originating elevation, a terminating elevation and an opening;
wherein the inclined surface is exposed to allow for the ready draining of a cooking vessel;
the originating elevation of the inclined surface beginning at the drain surface;
the terminating elevation of the inclined surface joining with and fully surrounding the strainer;
the strainer formed to the opening of the inclined surface and capable of connecting with a drain pipe; and
an oven.

* * * * *